United States Patent [19]

Fujii

[11] Patent Number: 5,181,023
[45] Date of Patent: Jan. 19, 1993

[54] TERMINAL UNIT OF A MOBILE COMMUNICATION SYSTEM

[75] Inventor: Masahiro Fujii, Tokyo, Japan

[73] Assignee: NEC Corporation, Japan

[21] Appl. No.: 606,112

[22] Filed: Oct. 31, 1990

[30] Foreign Application Priority Data

Oct. 31, 1989 [JP] Japan .................. 1-127221[U]

[51] Int. Cl.⁵ .................................................. H04Q 7/00
[52] U.S. Cl. ..................... 340/825.46; 340/825.44;
340/311.1; 74/89; 128/36; 310/81
[58] Field of Search ........... 340/825.46, 311.1, 825.44,
340/407; 74/87; 310/81, 314; 128/32, 34, 36, 67

[56] References Cited

U.S. PATENT DOCUMENTS

| | | | |
|---|---|---|---|
| 3,618,070 | 11/1971 | Kagan | 340/407 |
| 3,644,919 | 2/1972 | Mathauser | 128/25 B |
| 4,223,466 | 9/1980 | King | |
| 4,352,091 | 9/1982 | Yamasaki | 340/311.1 |
| 4,380,759 | 4/1983 | Sulkoski et al. | 340/407 |
| 4,392,135 | 7/1983 | Ohyagi | 340/825.44 |
| 4,654,631 | 3/1987 | Kurcbart et al. | 340/311.1 |
| 4,716,898 | 1/1988 | Chauve et al. | 128/67 |
| 4,794,392 | 12/1988 | Selinko | 74/87 |
| 4,879,759 | 11/1989 | Matsumoto et al. | |
| 5,007,105 | 4/1991 | Kudoh et al. | 340/311.1 |

FOREIGN PATENT DOCUMENTS

| | | | |
|---|---|---|---|
| 0247601 | 2/1987 | European Pat. Off. | |
| 2551875 | 5/1977 | Fed. Rep. of Germany | |
| 3125964 | 2/1983 | Fed. Rep. of Germany | 340/825.46 |
| 0175033 | 7/1987 | Japan | 340/825.66 |
| 8300345 | 8/1984 | Netherlands | |
| 2138616 | 10/1984 | United Kingdom | |

*Primary Examiner*—Donald J. Yusko
*Assistant Examiner*—Peter Weissman
*Attorney, Agent, or Firm*—Ostrolenk, Faber, Gerb & Soffen

[57] ABSTRACT

A terminal unit of a mobile communication system of the type using a vibrating device for alerting the user of the terminal unit to an incoming call by vibration. The terminal unit has a flat belt clip which is the single member of the terminal unit positioned closest to the user's body when the unit is put on the user's body. A piezoelectric element or similar vibration source included in the vibrating device is securely received in a recess which is formed in the body of the belt clip.

8 Claims, 3 Drawing Sheets

TERMINAL UNIT OF A MOBILE COMMUNICATION SYSTEM

BACKGROUND OF THE INVENTION

The present invention relates to a terminal unit of a mobile communication system and, more particularly, to a terminal unit of the type having a vibrating device for alerting the user to an incoming call.

A mobile communication system extensively used today includes a radio pager, portable radio telephone, cordless telephone or similar terminal unit. It has been customary with such a terminal unit to alert the user to an incoming call by an alert tone which is generated by a speaker or similar sounder installed in the unit. A current trend, however, is toward the replacement of the sounder with a vibrating device such as a miniature motor in order to avoid the alert tone which is simply an annoyance to persons around the user. The vibrating device is associated with the terminal unit in such a manner as to vibrate and thereby inform the user of the arrival of a call. If the casing of the terminal unit is great enough to accommodate the vibrating device, the latter is accommodated in the former. If otherwise, the vibrating device is accommodated in an adapter which is connected to the casing of the terminal unit. The problem with the vibrating device incorporated in the casing is that the vibration cannot be surely imparted to the user due to the size of the casing, often failing to alert the user to an incoming call. Likewise, the vibrator housed in the adapter is not satisfactory since the vibration thereof cannot be sufficiently imparted to the user depending on the size of the adapter. In the light of this, the vibrator may be mounted on the outer periphery of the casing or that of the adapter to transmit the vibration thereof directly to the user. Although this kind of scheme may successfully alert the user by vibration and promote easy mounting and dismounting of the vibrator, it increases the overall dimensions of the terminal unit.

SUMMARY OF THE INVENTION

It is therefore an object of the present invention to provide a terminal unit of a mobile communication system which surely imparts the vibration of a vibrator to the user even when the unit has a relatively large casing, thereby informing the user of the reception of a call without fail.

It is another object of the present invention to provide a generally improved terminal unit of a mobile communication system.

In accordance with the present invention, in a terminal unit of a mobile communication system having a vibrating device for alerting the user of the terminal unit to an incoming call by vibration, a vibration source included in the vibrating device is mounted on a single member of the terminal unit which is positioned, when the terminal unit is put on a part of the user's body, closest to that part of the user's body.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
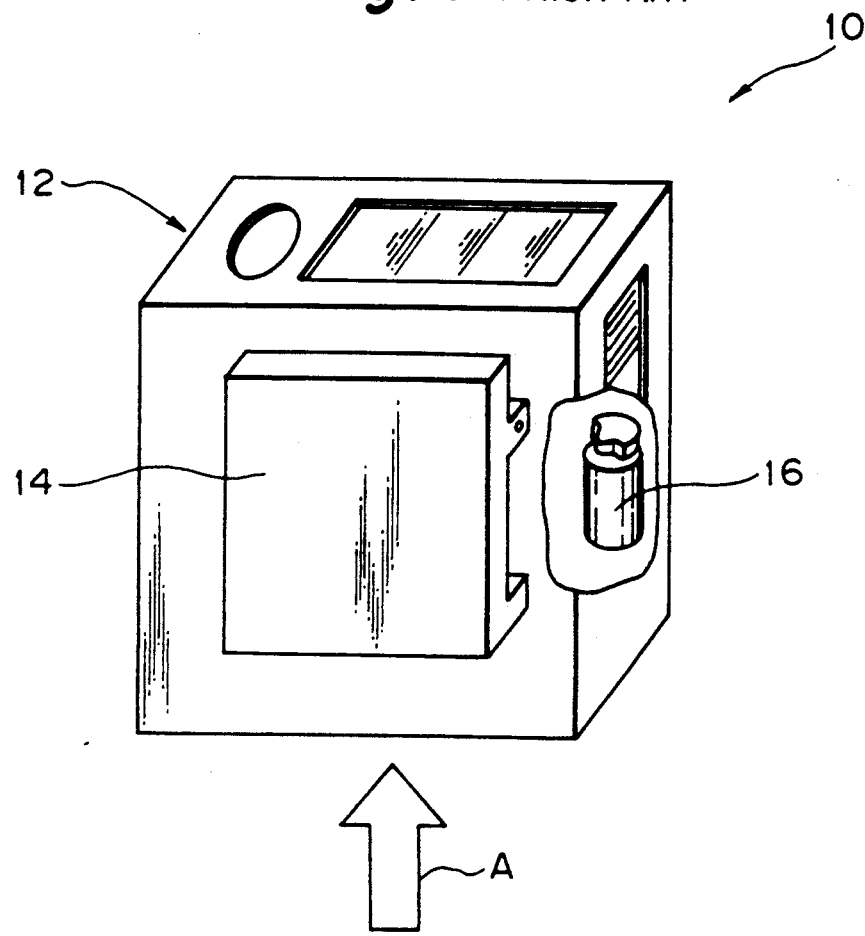
FIG. 1 is an external perspective view of a prior art terminal unit of the type using a vibrating device.
Figure 1:
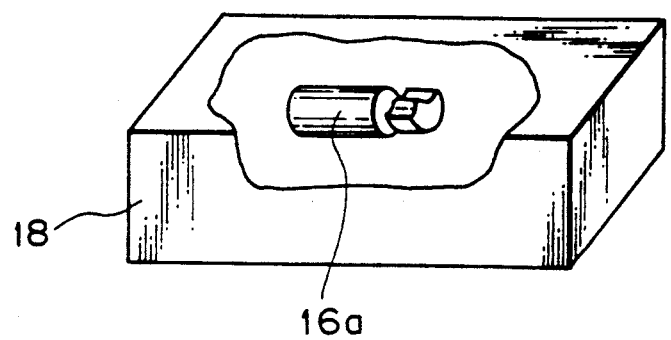

To better understand the present invention, a brief reference will be made to a conventional terminal unit of a mobile communication system of the type using a vibrating device, shown in FIG. 1. As shown, the terminal unit, generally 10, has a body 12, a belt clip or similar fixing member 14 hinged to the outer periphery of the casing 12, and a vibrating device implemented with a miniature motor 16 and accommodated in the body 12. When the unit body 12 is too small to accommodate such a vibrating device therein, an adapter 18 accommodating a miniature motor 16a therein is connected to the casing 12 in a direction indicated by an arrow A in the figure. When the terminal unit 10 receives a call from a remote station, the motor 16 incorporated in the unit body 12 or the motor 16a incorporated in the adapter 18 is caused to vibrate to inform the user of the unit 10 of the reception of the call. The drawback with this configuration is that the unit body 12 accommodating the motor 16 or the adapter 18 accommodating the motor 16a has such a size that the vibration often fails to reach the user, as discussed earlier.

Figure 2:
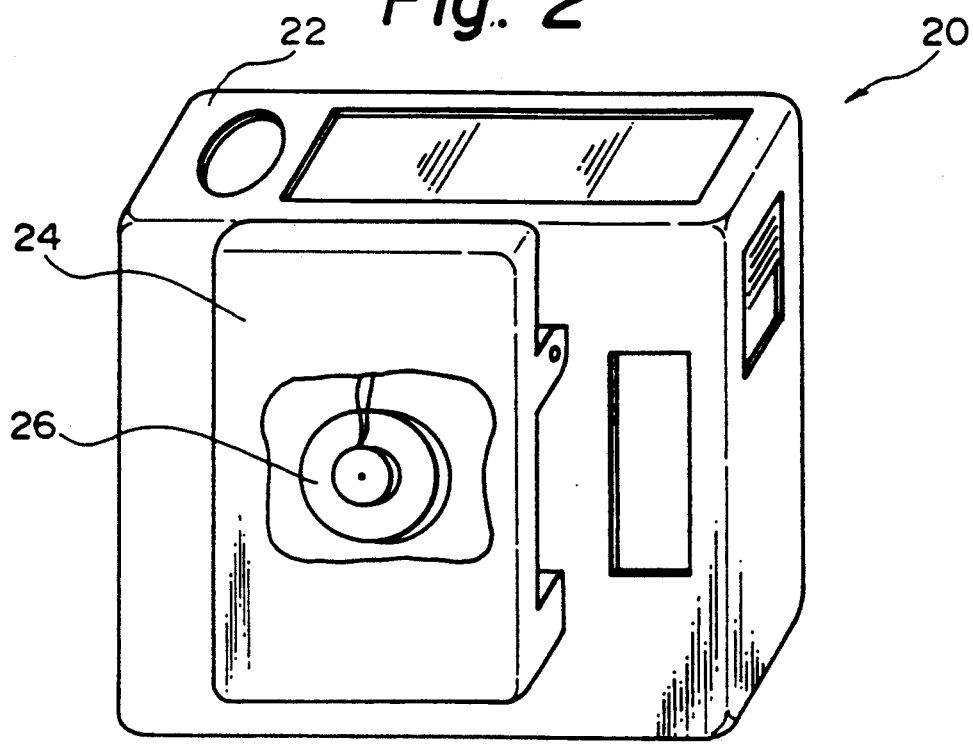
FIG. 2 is an external perspective view of a terminal unit with a vibrating device embodying the present invention.
Figure 3:
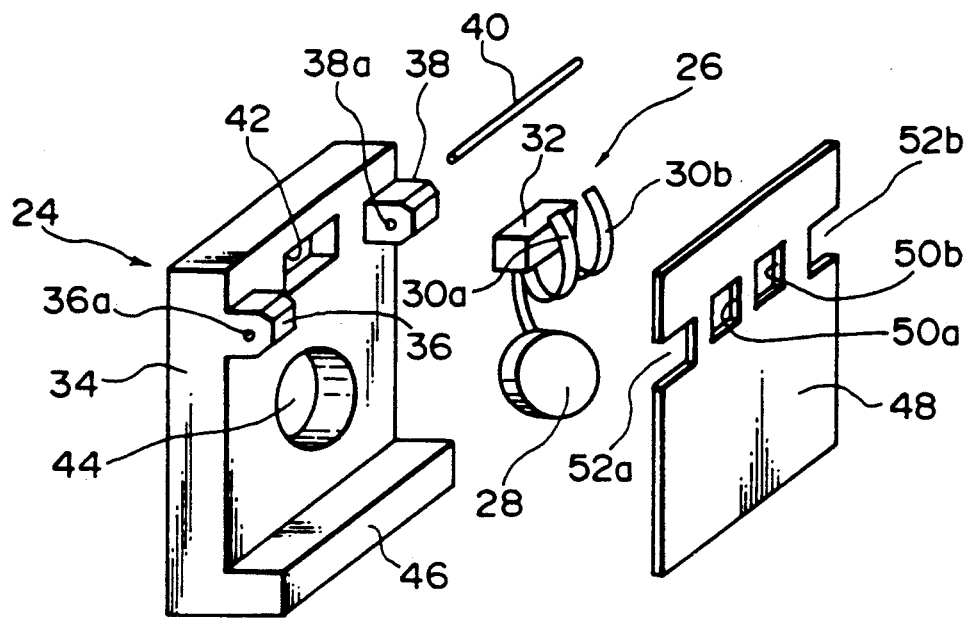
FIG. 3 is an exploded perspective view of the vibrating device and a fixing member included in the illustrative embodiment.
Figure 4:
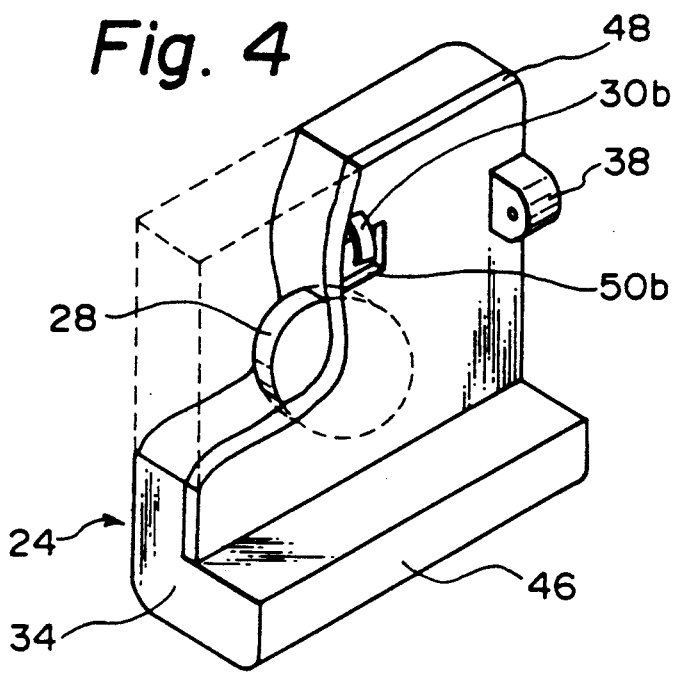
FIG. 4 is a fragmentary section showing a vibration source of the vibrating device of the embodiment which is mounted on the fixing.

Referring to FIG. 2, a terminal unit of a mobile communication system embodying the present invention is shown and generally designated by the reference numeral 20. As shown, the terminal unit 20 has a body 22, a belt clip or similar fixing member 24 rotatably mounted on the outer periphery of the body 22, and a soundless vibrating device 26 mounted on the fixing member 24. The vibrating device 26 includes a miniature motor, for example, and alerts the user to an incoming call by vibration in place of sound. FIG. 3 shows in an exploded perspective view the fixing member 24 removed from the unit body 22, and the vibrating device 26. The vibrating device 26 is made up of a miniature motor, piezoelectric element, electromagnetic vibrating element or similar vibration source 28, terminals 30a and 30b implemented with leaf springs, and a connector 32 interconnecting the vibration source 28 and terminals 30a and 30b. The fixing member 24 has a flat body 34 having a predetermined thickness and constituting a belt clip. A pair of hinges 36 and 38 protrude from one of two opposite major surfaces of the clip body 34 and have respectively through holes 36a and 38a for receiving a pin 40. Recesses 42 and 44 are formed in that surface of the clip body 34 where the hinges 36 and 38 are provided. The recesses 42 and 44 receive the connector 32 of the vibrating device 26 and the vibration source 28, respectively. A projection 46 also extends out from the clip body 34 to form a space between the clip body 34 and the unit body 12, so that the user's belt may be passed therethrough when the terminal unit 20 is put on the belt. The recesses 42 and 44 may be replaced with openings formed throughout the clip body 34. A flat cover 48 prevents the connector 32 and vibration source 28 from slipping out of the recesses 42 and 44, respectively. Specifically, as shown in FIG. 3, the cover 48 has openings 50a and 50b and notches 52a and 52b. The openings 50a and 50b allow the terminals 30a and 30b of the vibrating device 26 to protrude therethrough into contact with an electric circuit provided on the casing 12. The notches 52a and 52b receive respectively the hinges 36 and 38 extending out from the clip body 34. FIG. 4 shows the vibrating device 26, particularly the vibration source 28 thereof, which is fixed in place by the cover 48.

Figure 5:
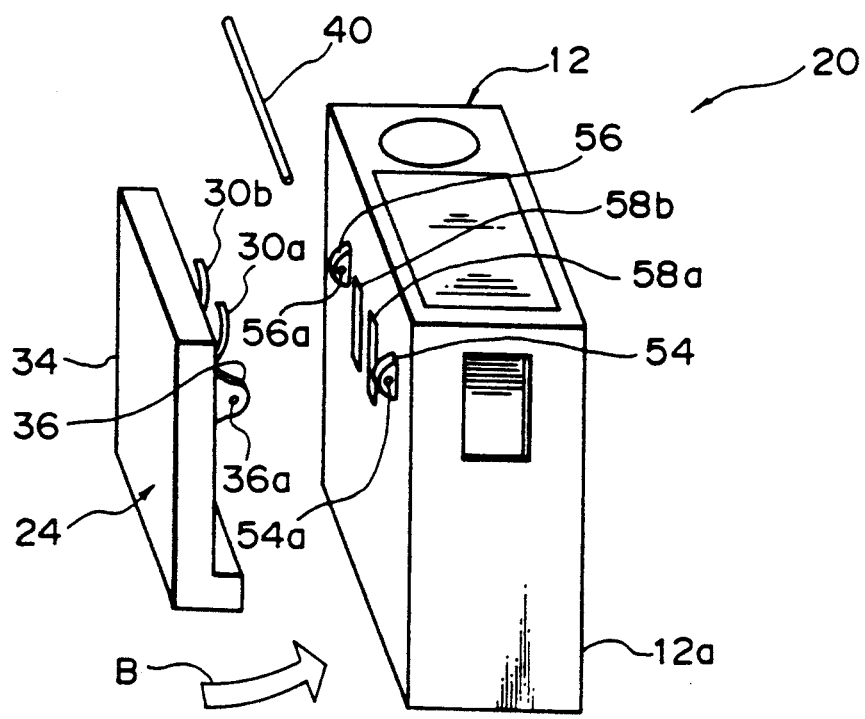
FIG. 5 is an external perspective view of the body of the terminal unit to which the fixing member carrying the vibrating device therewith is fixed.

Referring to FIG. 5, the body 12 of the terminal unit 20 has a casing 12a on which the fixing member 24 with the vibrating device 26 is mounted. A pair of hinges 54 and 56 are provided on one of opposite major surfaces of the casing 12a and have respectively through holes 54a and 56a for receiving the pin 40. Connecting terminals 58a and 58b are positioned on the same surface of the casing 12a as the hinges 54 and 56. The leaf springs or terminals 30a and 30b of the vibrating device 26 protruding through the openings 50a and 50b of the cover 48 are respectively held in contact with the connecting terminals 58a and 58b, whereby the vibration source 28 is electrically connected to the electric circuit incorporated in the unit body 12. In assembly, after the hinges 36, 38, 54 and 56 have been aligned, the pin 40 is inserted into the holes 36a, 38a, 54a and 56a of the hinges. As a result, the fixing member or belt clip 24 loaded with the vibrating device 26 is hinged to the unit body 12. If desired, an arrangement may be made such that the terminals 30a and 30b resiliently bias the fixing member 24 counterclockwise about the pin 40, as indicated by an arrow B.

In summary, in the illustrative embodiment, a vibrating source constituting a vibrating device is received in a recess formed in the body of a flat belt clip. Moreover, the clip body is thin enough to surely impart the vibration of the vibration source to the user who wears the terminal unit. Specifically, since the vibration source is mounted on a particular member of the terminal unit which is positioned closest to the user's body, the vibration is surely transmitted to the user's body with no regard to the size of the unit body. In this sense, the particular member mentioned above is not limited to the belt clip which is adapted to fix the terminal unit to the user's belt.

Various modifications will become possible for those skilled in the art after receiving the teachings of the present disclosure without departing from the scope thereof.

What is claimed is:

1. A terminal unit of a mobile communication system having vibrating means for alerting a user of said terminal unit to an incoming call by vibration, comprising:
a vibration source included in said vibrating means, said vibration source being mounted on a belt clip of said terminal unit, said belt clip comprising a flat body having a predetermined thickness, and a vibration source retaining portion being provided at one of two opposite major surfaces of said flat body for retaining said vibration source on said belt clip, such that said vibration source is positioned, when the user wears said terminal unit, at a portion of said terminal unit closest to said user's body.

2. A terminal unit as claimed in claim 1, wherein said belt clip further comprises a connector retaining portion provided on said one major surface of said flat body for retaining a connector which is included in said vibrating means for connecting said vibration source to an electric circuit of said terminal unit.

3. A terminal unit as claimed in claim 2, wherein each of said vibration source retaining portion and said connector retaining portion comprises a recess in said flat body for receiving an associated one of said vibration source and said connector.

4. A terminal unit as claimed in claim 3, wherein said belt clip further comprises a cover for preventing said vibration source and said connector from slipping out of said recesses.

5. A terminal unit as claimed in claim 4, wherein said cover comprises openings through which terminals in the form of leaf springs are passed to make contact with connecting terminals provided on a casing of said terminal unit, whereby said vibration source is connected to said electric circuit of said terminal unit via said connector.

6. A terminal unit as claimed in claim 1, wherein said vibration source of said vibrating means comprises a miniature motor.

7. A terminal as claimed in claim 1, wherein said vibration source of said vibrating means comprises a piezoelectric element.

8. A terminal as claimed in claim 1, wherein said vibration source of said vibrating means comprises an electromagnetic vibrating element.

* * * * *